(12) United States Patent
Virolainen et al.

(10) Patent No.: US 7,408,791 B2
(45) Date of Patent: Aug. 5, 2008

(54) FREQUENCY CONVERTER ASSEMBLY AND METHOD OF USING FREQUENCY CONVERTER ASSEMBLY

(75) Inventors: Panu Virolainen, Espoo (FI); Kalle Suomela, Järvenpää (FI)

(73) Assignee: ABB Oy, Helsinki (FI)

( * ) Notice: Subject to any disclaimer, the term of this patent is extended or adjusted under 35 U.S.C. 154(b) by 0 days.

(21) Appl. No.: 11/600,074

(22) Filed: Nov. 16, 2006

(65) Prior Publication Data

US 2008/0013353 A1   Jan. 17, 2008

(30) Foreign Application Priority Data

Nov. 25, 2005   (FI)   ................... 20055627

(51) Int. Cl.
*H02M 5/40* (2006.01)
*H02M 5/44* (2006.01)

(52) U.S. Cl. ......................................... 363/37; 318/375

(58) Field of Classification Search ................... 318/57, 318/63, 86, 703, 741, 757, 762, 261, 273, 318/375–380; 363/34, 35, 37
See application file for complete search history.

(56) References Cited

U.S. PATENT DOCUMENTS 4,434,393 A * 2/1984 Kobari et al. ............... 318/757
4,879,639 A * 11/1989 Tsukahara ................... 363/37
4,904,918 A * 2/1990 Bailey et al. ................ 318/762

FOREIGN PATENT DOCUMENTS

| JP | 10-248281 A | 9/1998 |
| JP | 2000-188897 A | 7/2000 |
| JP | 2005-224031 A | 8/2005 |

OTHER PUBLICATIONS

Finnish Search Report dated May 16, 2006 (with English translation of category of cited documents.
Finnish Office Action dated May 16, 2006.

* cited by examiner

*Primary Examiner*—Gary L Laxton
(74) *Attorney, Agent, or Firm*—Buchanan Ingersoll & Rooney PC

(57) ABSTRACT

A frequency converter assembly comprising a direct-voltage circuit and brake chopper means, the direct-voltage circuit including a first branch (DC+) and a second branch (DC−), and the brake chopper means including a first terminal (BRK+), a second terminal (BRK−), a brake chopper switch (S1) and control means (2). The brake chopper switch (S1) is arranged in its closed position to provide a braking connection, in which the first branch (DC+) is electrically connected to the first terminal (BRK+) and the second branch (DC−) is electrically connected to the second terminal (BRK−). The assembly is provided with a first operating state where the control means (2) are arranged to control the brake chopper switch (S1) selectively to the closed position and the open position in response to the desired power supply direction of the direct-voltage circuit. The assembly is further provided with a second operating state where the control means (2) are arranged to maintain the brake chopper switch (S1) continuously in the closed position.

11 Claims, 1 Drawing Sheet

FREQUENCY CONVERTER ASSEMBLY AND METHOD OF USING FREQUENCY CONVERTER ASSEMBLY

BACKGROUND OF THE INVENTION

The invention relates to frequency converters provided with a brake chopper switch.

It is known to connect a brake chopper switch and a brake resistor to direct-voltage intermediate circuits of frequency converters in such a manner that, when the brake chopper switch is in its closed position, current flows from the positive branch of the direct-voltage intermediate circuit to the negative branch of the direct-voltage intermediate circuit via the brake resistor. Such a connection allows the braking of a motor supplied by the frequency converter. The brake resistor may be an internal or external component. An internal brake resistor may be a component integrated into the frequency converter, and an external brake resistor may be a detachably attachable component. The frequency converter may comprise a positive terminal and a negative terminal, between which the external brake resistor may be connected.

It is also known to use the direct-voltage intermediate circuit of a frequency converter for supplying direct current out of the frequency converter. It is also possible to arrange the frequency converter in such a manner that its direct-voltage intermediate circuit may be connected to the intermediate circuit of another frequency converter to provide a common DC bus connection.

To provide a frequency converter with both terminals allowing the connection of an external brake resistor and poles allowing the supply of direct-voltage power out of and/or into the direct-voltage intermediate circuit is problematic, because the great number of terminals requires a lot of space and increases manufacturing costs.

BRIEF DESCRIPTION OF THE INVENTION

It is an object of the invention to provide a frequency converter assembly and a method of using a frequency converter assembly so that the above-mentioned problems can be solved. The objects of the invention are achieved by a frequency converter assembly and a method, which are characterized by what is disclosed in the independent claims. The preferred embodiments of the invention are disclosed in the dependent claims.

The invention is based on providing the frequency converter assembly with an operating state where the brake chopper switch is continuously in the closed position.

In the frequency converter assembly of the invention, terminals arranged to connect the external brake resistor may also be used for providing direct-current supply. In addition, an external brake chopper unit provided with its own brake chopper switch may, if required, be connected to the terminals, and thus the braking may be controlled by means of the brake chopper switch of the external brake chopper unit.

The frequency converter assembly of the invention may be implemented with fewer components than a corresponding prior art assembly. Thus, the frequency chopper assembly of the invention may be constructed in a smaller space and the manufacturing costs thereof are lower.

BRIEF DESCRIPTION OF THE FIGURES

The invention will now be described in greater detail in association with the preferred embodiments and with reference to the attached drawings, in which.

DETAILED DESCRIPTION OF THE INVENTION

Figure 1:
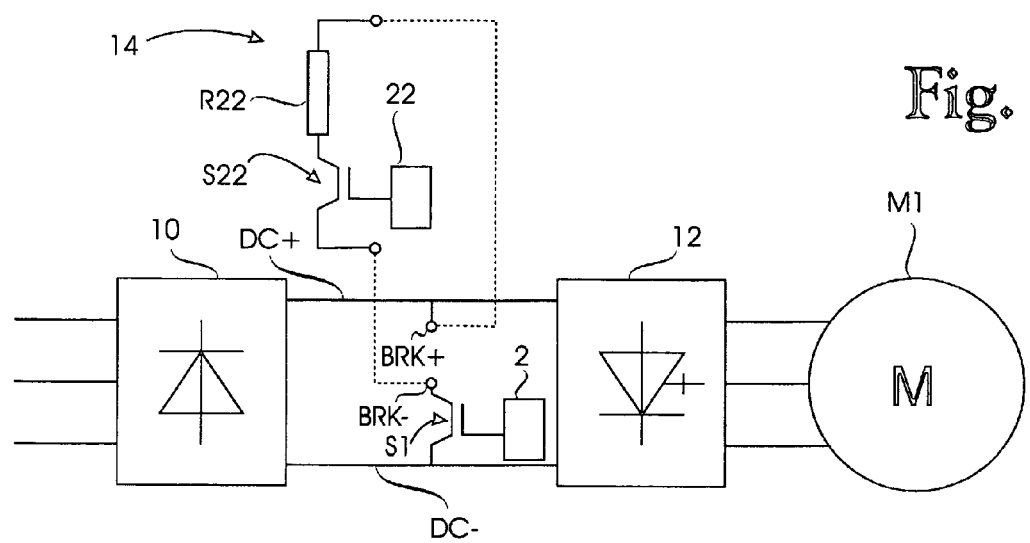
FIG. 1 shows a frequency converter assembly according to an embodiment of the invention.

A frequency converter assembly of FIG. 1 comprises a direct-voltage circuit and brake chopper means. The direct-voltage circuit is electrically located between a rectifier unit 10 and an inverter unit 12. The alternating-voltage side of the rectifier unit 10 is connected to a supplying electrical network and its direct-voltage side is connected to the direct-voltage circuit of the frequency converter assembly. The direct-voltage side of the inverter unit 12 is connected to the direct-voltage circuit and its alternating-voltage side to a motor M1 to be supplied.

The direct-voltage circuit includes a first branch DC+, which has a positive voltage during operation, and a second branch DC−, which has a negative voltage during operation. The brake chopper means comprise a first terminal BRK+, a second terminal BRK−, a brake chopper switch S1, and programmable control means 2.

The brake chopper switch S1 is an IGBT transistor. The emitter of the brake chopper switch S1 is electrically connected to the second branch DC− of the direct-voltage circuit. The control means 2 are electrically connected to the base of the brake chopper switch S1 to control the brake chopper switch S1 selectively to the closed position and the open position.

The first terminal BRK+ is electrically connected to the first branch DC+. The second terminal BRK− is electrically connected to the collector of the brake chopper switch S1.

In the frequency converter assembly of the invention, the brake chopper switch may be an IGBT transistor, as in the embodiment of FIG. 1, or some other semiconductor switch or any switch component with suitable properties.

The frequency converter assembly has a first operating state and a second operating state. In the first operating state, the control means 2 are arranged to control the brake chopper switch S1 selectively to the closed position and the open position in response to the desired power supply direction of the direct-voltage circuit. If power needs to be transferred from the direct-voltage circuit to the inverter unit 12, the brake chopper switch S1 is maintained in the open position, and if power needs to be transferred from the inverter unit 12 to the direct-voltage circuit, the brake chopper switch S1 is maintained at least periodically in the closed position. In the second operating state, the control means 2 are arranged to maintain the brake chopper switch S1 continuously in the closed position. The control means 2 are arranged in such a manner that the changing between the first operating state and the second operating state may be performed programmatically.

When the frequency converter assembly of FIG. 1 is to be used in the first operating state, a brake resistor (not shown) is connected between the first terminal BRK+ and the second terminal BRK−. When the frequency converter assembly is in the first operating state and the motor M1 supplied by the frequency converter assembly needs to be braked, i.e. power needs to be transferred from the motor M1 to the direct-voltage circuit, the brake chopper switch S1 is controlled at least periodically to the closed position. When the brake chopper switch S1 is in the closed position, current generated by the motor M1 flows via the inverter unit 12 and the direct-voltage circuit to said brake resistor, and power consumed by the brake resistor causes that the rotational speed of the motor slows down.

When the motor M1 is braked by supplying electric power to the brake resistor, the brake chopper switch S1 may be controlled by means of a predefined pulse pattern, for example. The brake chopper switch S1 controlled by the pulse pattern is occasionally in the closed position and the rest of the time in the open position. Naturally, power is transferred to the brake resistor only when the brake chopper switch S1 is in its closed position.

The motor supplied by the frequency converter assembly of the invention may also be braked to some extent by supplying electric energy from the motor via the inverter unit to the direct-voltage circuit without supplying electric energy from the direct-voltage circuit further to the brake resistor. However, the capability of the direct-voltage intermediate circuit to receive electric energy is usually fairly limited, and an excessive supply of electric energy to the direct-voltage circuit may damage the direct-voltage circuit.

The frequency converter assembly of the invention may be used for supplying electric energy from the direct-voltage circuit via the brake chopper switch to the brake resistor when there is a danger that the energy storing capacity of the direct-voltage circuit will be exceeded. In the first operating state of the frequency converter assembly, the brake chopper switch is in the closed position when the power supply direction of the direct-voltage circuit needs to be from the direct-voltage circuit to the brake resistor.

In the first operating state of the frequency converter assembly, the control of the brake chopper switch may be based on the magnitude of the direct voltage of the direct-voltage circuit. When the actual value of the direct voltage of the direct-voltage circuit exceeds the switch-on limit, the brake chopper switch is switched to the closed position, and when the actual value of the direct voltage of the direct-voltage circuit is below the switch-off limit, the brake chopper switch is switched to the open position. Thus, power is supplied to the brake resistor only when the direct voltage of the direct-voltage circuit needs to be reduced.

When the frequency converter assembly is in the first operating state and the frequency converter assembly is used for supplying power to the motor, i.e. from the direct-voltage circuit to the inverter unit 12, the brake chopper switch S1 is controlled to be open and no current flows through the brake resistor.

When the frequency converter assembly is in the second operating state, the second branch DC− of the direct-voltage circuit is in a continuous electric connection with the second terminal BRK−.

The second operating state of the frequency converter assembly may be used in cases where an external brake chopper unit provided with a separate switch and resembling, for instance, the external brake chopper unit 14 of FIG. 1 is to be connected to the terminals BRK+ and BRK− of the direct-voltage circuit. The brake chopper unit 14 comprises a brake resistor element R22 and an auxiliary brake chopper switch S22 connected in series with it, and control means 22 arranged to control the auxiliary brake chopper switch S22. The brake chopper unit 14 is arranged to be detachably connectable to the terminals BRK+ and BRK− of the brake chopper means. During operation, the external brake chopper unit 14 is connected to the terminals BRK+ and BRK− according to the broken lines of FIG. 1.

The second operating state may also be used, for example, when the purpose is to use the frequency converter assembly as a direct-voltage supply, in which case the direct-voltage load is connected between the terminals BRK+ and BRK−.

When the frequency converter assembly of FIG. 1 is in the second operating state and the external brake chopper unit 14 is connected to the terminals BRK+ and BRK− of the brake chopper means, the motor M1 supplied by the frequency converter assembly may be braked by controlling the auxiliary brake chopper switch S22 to close, whereby the current generated by the motor M1 flows via the inverter unit 12 and the direct-voltage circuit to the brake resistor element R22, and the power consumed by the brake resistor element R22 causes that the rotational speed of the motor M1 slows down.

The frequency converter assembly of the invention may be arranged in such a manner that direct-current power may be supplied via the first terminal BRK+ and the second terminal BRK− into and out of the direct-voltage circuit. In this case, the direct-voltage circuit may be connected to the direct-voltage circuit of the second frequency converter assembly by means of the first terminal BRK+ and the second terminal BRK− to provide a common DC bus connection. Alternatively, the direct-voltage circuit may also be connected via the terminals BRK+ and BRK− to some other direct-current power supply. The brake chopper means of the frequency converter assembly may be designed to withstand the continuous transfer of power, the magnitude of which equals to the nominal power of the direct-voltage circuit, between the first terminal BRK+ and the second terminal BRK−.

Figure 2:
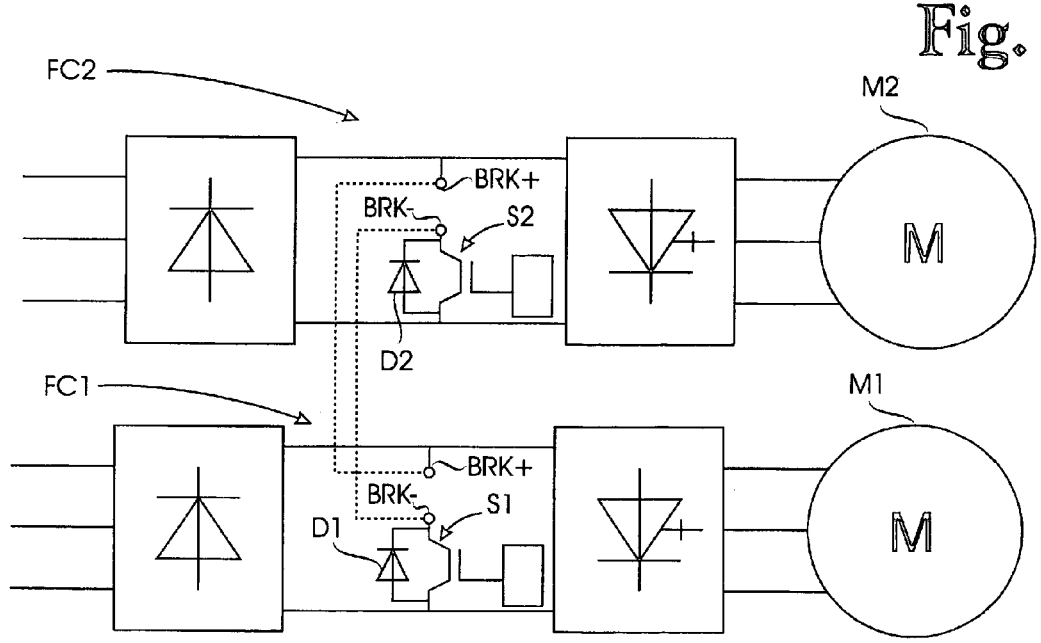
FIG. 2 shows two frequency converter assemblies according to a second embodiment of the invention, the direct-voltage circuits of which are joined by a common DC bus connection.

FIG. 2 shows two frequency converter assemblies of the invention, the direct-voltage circuits of which are joined by a common DC bus connection. The connection of the direct-voltage circuits is illustrated by broken lines. The direct-voltage circuits of the lower frequency converter assembly FC1 and the upper frequency converter assembly FC2 are joined via the terminals BRK+ and BRK− of the brake chopper means. The positive branch of the direct-voltage circuit of FC1 is connected to the positive branch of the direct-voltage circuit of FC2, and the negative branch of the direct-voltage circuit of FC1 is connected to the negative branch of the direct-voltage circuit of FC2. In the common DC bus connection, both the brake chopper switch S1 of the frequency converter assembly FC1 and the brake chopper switch S2 of the frequency converter assembly FC2 are continuously in the closed position.

The lower frequency converter assembly FC1 is otherwise similar to the frequency converter assembly of FIG. 1, but it is provided with a rectifying diode element D1, which is connected in anti-parallel with the brake chopper switch S1. The upper frequency converter assembly FC2 is identical with the lower frequency converter assembly FC1.

Components corresponding to the components S1 and D1 of the frequency converter FC1 are denoted by references S2 and D2 in the frequency converter FC2. Both the brake chopper switches S1 and S2 and the rectifying diode elements D1 and D2 are designed to withstand a continuous current of the same magnitude as the direct-voltage circuits of the frequency converters.

The rectifying diode element in each frequency converter assembly of FIG. 2 serves as a free-wheeling diode, and it may be a diode or another similar component. The rectifying diode element D1 allows that power may be supplied to the direct-voltage circuit of the frequency converter FC1 from the direct-voltage circuit of the frequency converter FC2. Accordingly, the rectifying diode element D2 allows that power may be supplied to the direct-voltage circuit of the frequency converter FC2 from the direct-voltage circuit of the frequency converter FC1.

In an operating situation where the motor M2 supplied by the frequency converter FC2 is braked and the motor M1 supplied by the frequency converter FC1 is simultaneously accelerated, power may be transferred from the motor M2 via the direct-voltage circuit of the frequency converter FC2 to the direct-voltage circuit of the frequency converter FC1 and further to the motor M1. In this way, an essential part of the braking energy of the motor M2 can be recovered, unlike when the brake resistor is used. The braking energy of the motor M1 may be supplied to the motor M2 in a corresponding manner.

In the above embodiments, a rectifier unit capable of supplying power from the network to the direct-voltage circuit is connected to that end of the direct-voltage circuit which is located on the side of the supply network. The frequency converter assembly according to the invention may alternatively comprise a unit between the direct-voltage circuit and the supply network, the unit being also capable of feeding power from the direct-voltage circuit to the network. In such an assembly, power could be supplied via the terminals of the brake chopper means to the brake resistor when, for some reason, power would not be supplied to the network or it would be impossible to supply power to the network due to a technical fault, for instance.

It is obvious to a person skilled in the art that the basic idea of the invention may be implemented in various ways. The invention and the embodiments thereof are thus not restricted to the above examples but they may vary within the scope of the claims.

The invention claimed is:

1. A frequency converter assembly comprising:
   a direct-voltage circuit and brake chopper means,
   wherein the direct-voltage circuit includes a first branch and a second branch, and the brake chopper means includes a first terminal, a second terminal, a brake chopper switch and control means,
   wherein the brake chopper switch is arranged in its closed position to provide a braking connection, in which the first branch of the direct voltage circuit is electrically connected to the first terminal and the second branch of the direct voltage circuit is electrically connected to the second terminal,
   wherein the assembly is provided with a first operating state in which the control means are arranged to control the brake chopper switch selectively to the closed position and the open position in response to a desired power supply direction of the direct-voltage circuit, and a second operating state in which the control means are arranged to maintain the brake chopper switch continuously in the closed position despite a power supply direction of the direct-voltage circuit, and
   wherein the assembly is arranged such that direct-current power is supplied via the first terminal and the second terminal both into and out of the direct-voltage circuit.

2. The frequency converter assembly as claimed in claim 1, wherein the control means are programmable such that the frequency converter assembly is capable of transferring programmatically from said first operating state to said second operating state.

3. The frequency converter assembly as claimed in claim 1, wherein the assembly comprises a rectifying diode element, which is connected in anti-parallel with the brake chopper switch.

4. The frequency converter assembly as claimed in claim 1, wherein the brake chopper means are designed to withstand the continuous transfer of power, a magnitude of which equals to a nominal power of the direct-voltage circuit, between the first terminal and the second terminal.

5. The frequency converter assembly as claimed in claim 4, wherein the assembly also comprises an external brake chopper unit, which is arranged to be detachably connectable to the terminals of the brake chopper means and comprises a brake resistor element and an auxiliary brake chopper switch connected in series with it.

6. The frequency converter assembly as claimed in claim 4, further comprising a first converter unit and a second converter unit, the first converter unit being arranged to be connected to a supplying electrical network and the second converter unit being arranged to be connected to a load, wherein the direct-voltage circuit is located electrically between the first converter unit and the second converter unit.

7. The frequency converter assembly as claimed in claim 6, wherein in the first operating state of the assembly, the brake chopper switch is maintained in the open position when power is supplied from the direct-voltage circuit to the load and the brake chopper switch is maintained at least periodically in the closed position when power is supplied from the load to the direct-voltage circuit.

8. The frequency converter assembly as claimed in claim 1, wherein the assembly also comprises an external brake chopper unit, which is arranged to be detachably connectable to the terminals of the brake chopper means and comprises a brake resistor element and an auxiliary brake chopper switch connected in series with it.

9. The frequency converter assembly as claimed in claim 1, further comprising:
   a first converter unit and a second converter unit,
   the first converter unit being arranged to be connected to a supplying electrical network and the second converter unit being arranged to be connected to a load,
   wherein the direct-voltage circuit is located electrically between the first converter unit and the second converter unit.

10. The frequency converter assembly as claimed in claim 9, wherein in the first operating state of the assembly, the brake chopper switch is maintained in the open position when power is supplied from the direct-voltage circuit to the load and the brake chopper switch is maintained at least periodically in the closed position when power is supplied from the load to the direct-voltage circuit.

11. A method of using a frequency converter assembly, the frequency converter assembly comprising a direct-voltage circuit and brake chopper means, the direct-voltage circuit including a first branch and a second branch, and the brake chopper means including a first terminal, a second terminal, and a brake chopper switch, the brake chopper switch being arranged in its closed position to provide a braking connection, in which the first branch is electrically connected to the first terminal and the second branch is electrically connected to the second terminal,
   the method comprising steps of
   in a first operating state, controlling the brake chopper switch selectively to the closed position and the open position in response to a desired power supply direction of the direct-voltage circuit;
   in a second operating state maintaining the brake chopper switch continuously in the closed position despite the desired power supply direction of the direct-voltage circuit;
   supplying direct-current power via the first terminal and the second terminal out of the direct-voltage circuit while the brake chopper switch is in the closed position; and
   supplying direct-current power via the first terminal and the second terminal into the direct-voltage circuit while the brake chopper switch is in the closed position.

* * * * *